May 17, 1938.  F. G. G. ARMSTRONG  2,117,590
SUSPENSION ARRANGEMENT FOR ROAD VEHICLES
Filed Feb. 3, 1937  2 Sheets-Sheet 1
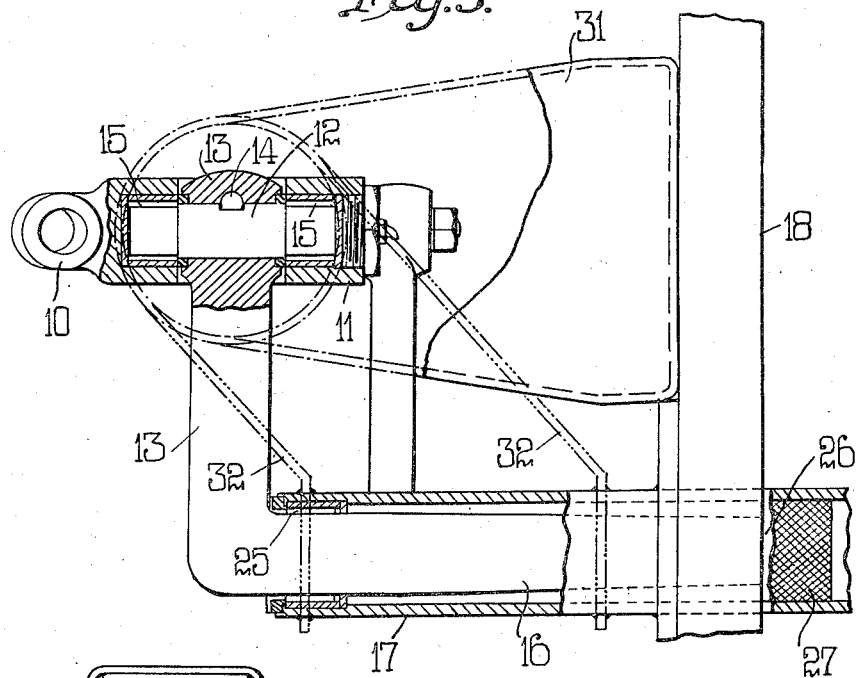
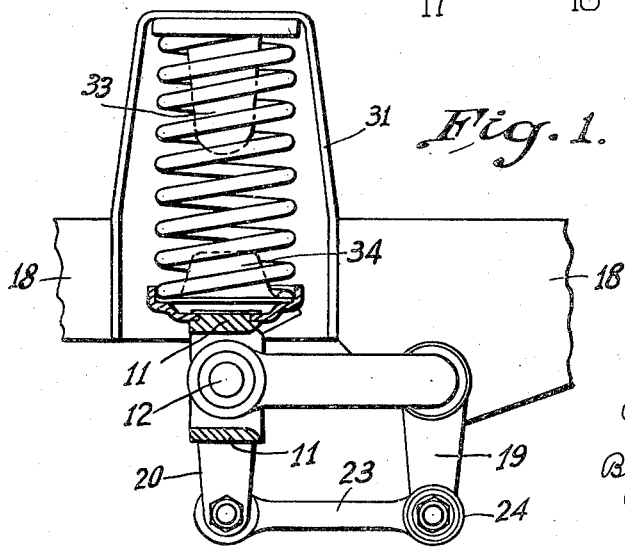
Inventor:
Fullerton G. G. Armstrong
By: Mason & Porter
Attorneys

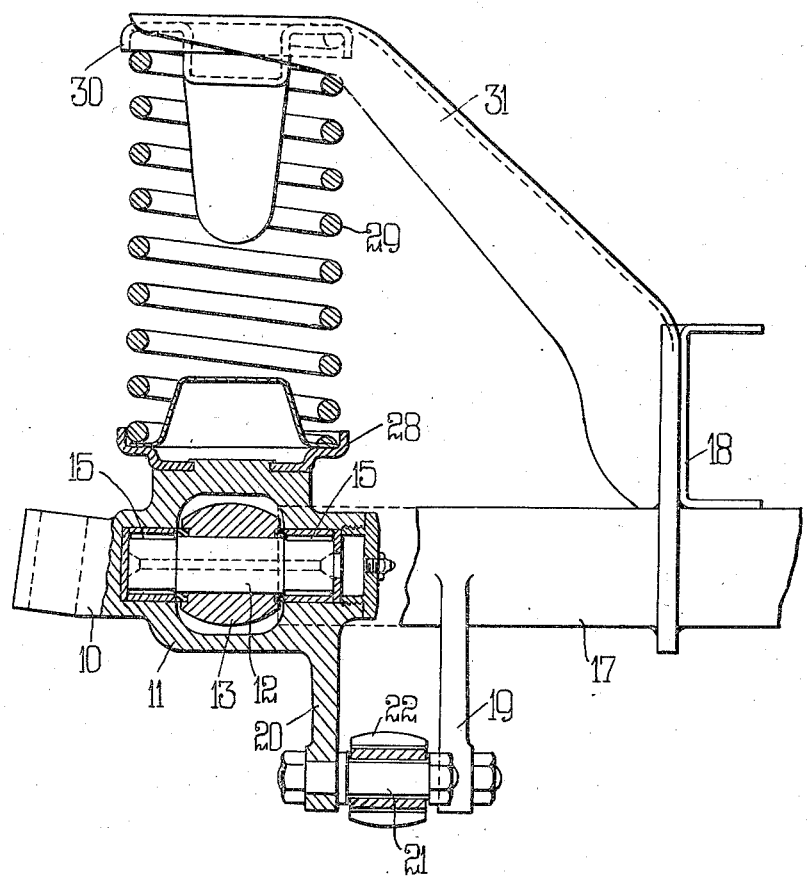

Patented May 17, 1938

2,117,590

UNITED STATES PATENT OFFICE 2,117,590

SUSPENSION ARRANGEMENT FOR ROAD VEHICLES

Fullerton George Gordon Armstrong, Beverley, England

Application February 3, 1937, Serial No. 123,925
In Great Britain March 5, 1936

2 Claims. (Cl. 267—20)

The present invention relates to suspension arrangements for vehicles of the type in which resiliently loaded pivotal means are provided between the vehicle body or chassis and the wheels or each wheel separately.

The object of the present invention is to provide an improved form of suspension means of the above type. In contrast with the constructions wherein a pair of resiliently loaded levers are pivoted to the frame at spaced points and also to a link connected to the wheel axle, the present invention has for a secondary object the substitution of relatively light but rigid means for one of the levers without impairing the strength of the suspension arrangement as a whole.

According to the present invention a vehicle frame is supported on a wheel by a relatively strong lever one end of which is pivoted on the frame and the other end of which is pivoted to a member carrying the wheel axle, the link being maintained in a predetermined direction relatively to the frame by a tie rod of relatively light construction extending between the opposite end of the link and a point on the frame, relative displacement between the axle and the frame being resisted by resilient means interposed between the upper end of the link and the frame or a bracket thereon.

The invention is more particularly described with reference to the accompanying drawings, in which:—

Figure 1 is a side elevational view of a suspension arrangement according to the present invention.

Figure 2 is a corresponding end view partly in section.

Figure 3 is a corresponding plan view.

In the construction according to the drawings a king pin for supporting a wheel axle and the wheel thereof is adapted to be mounted in a bearing 10 on a housing 11 which carries a pivot 12 for a lever 13. The lever 13 is bored at one end to surround the pivot 12 and is keyed thereto at 14, the pivot being mounted in bearings 15 in the housing so as to rotate therein on angular displacement of the lever 13. For this purpose the housing is open at one side to permit of the passage of the lever therethrough.

The opposite end of the lever 13 is bent at right angles, the right angle portion 16 being carried within a tubular member 17 of the chassis or body 18 of the vehicle and in a direction transversely of said body or chassis so that on relative displacement of a wheel and the chassis the lever 13 is angularly displaced about the axis of the part 16 and the tube 17.

A bracket 19 is rigidly mounted on the chassis or body 18 whilst the housing 11 also has a depending bracket 20 which is rigidly connected to the housing 11 or is integral with it. The lower end of the bracket 20 of the housing 11 carries a pivot 21 for the eyelet end 22 of a tie rod 23 which is of relatively light construction in contrast with the lever 13, the opposite end of the tie rod 23 being pivotally mounted at 24 to the base of the fixed bracket 19 on the body or chassis.

Any desired form of bearing 25 may be provided at the eyelet end 22 of the tie rod 23 or at the pivot 24. If desired, these bearings may be of the resilient or flexible type such as, for example, that known in the trade as "silent bloc" bearings. Again, the end 16 of the lever 12 may be mounted in any desired form of bearing 25 within the tube 17 either at both ends of the part 16 or merely at the elbow end where the part 16 merges into the part 13 of the lever. In the latter event the remote end 26 of the part 16 of the lever 13 may either be fixed to the tube 17 so that the part 16 constitutes a torsion bar or again, a tubular block 27 may be interposed between the end 26 of the part 16 and the tube 17, the tubular block constituting a stabilizer to resist angular displacement of the part 16 of the lever 13 about its own axis in either direction of angular rotation.

The upper part of the housing 11 carries a cup shaped seating 28 for the lower end of a coiled spring 29 the upper end of which is held in position by an inverted cup shaped seating 30 of a bracket 31 which may be secured either to the body or chassis 18 of the vehicle as shown in full lines in Figures 1, 2 and 3, or to the tube 17 as shown in chain dotted lines at 32 in Figure 3 only.

This coiled spring 29 constitutes the resilient loading for the lever 13 to resist angular displacement of said lever 12 about the axis of the part 16 of the lever on any tendency for relative displacement between the body of the vehicle and a wheel which may arise due to the wheel meeting an obstruction in the road surface along which the vehicle is travelling.

A rubber buffer 33 carried by the upper seating 28 is provided co-axial with the coiled spring 29 to limit the compression on said spring during angular displacement of the lever 13, said buffer on a predetermined compression of the spring being reached engaging with a stop 34 carried by the lower cup 28.

It will be appreciated that the lever 13 itself and the spring 29 constitute the resiliently loaded pivotal means for suspending the wheel from the vehicle body, the tie rod 23 functioning solely as a reaction means to maintain the housing and the bracket 20 erect during acceleration or braking of the wheel in any position of angular displacement of the lever 13. In this respect it will be appreciated that should the tie rod be omitted the housing 11 would have a tendency to rotate about the pivot 12 on braking or acceleration. From this it follows that the tie rod may be of relatively small dimensions and strength as compared with the lever 13 and in fact, may be constituted by any bar rod or the like which possesses rigidity as distinct from strength.

I declare that what I claim is:

1. A suspension arrangement for vehicle bodies comprising a vehicle frame having a depending bracket arm, a pair of spaced pivots one on said frame and one on said bracket arm, a vehicle wheel, a wheel axle, a housing carrying said axle, said housing having a passage therethrough and having a depending right angle portion, a second pair of pivots one in the passage through said housing and one on said depending right angle portion, a relatively strong crank lever having one arm connected to the pivot on said depending right angle portion and having one arm connected to the pivot in the passage in said housing, a tie rod of relatively light rigid construction extending between the pivots on said depending bracket arm and on said right angle portion, a bracket carried by said frame and a coiled spring interposed between said bracket and said housing for resisting angular displacement of said lever about its pivots.

2. A suspension arrangement for vehicle bodies comprising a vehicle frame having a tubular member extending transversely thereof, a bracket arm depending from said tubular member, a pair of pivots one on said frame in alignment with said tubular member and the other on said bracket arm, a vehicle wheel, a wheel axle, a housing carrying said axle, said housing having a passage therethrough and having a depending right angle portion, a pair of pivots one disposed in the passage through said housing and the other carried by said right angle portion, a relatively strong crank lever having one arm journaled extending into said tubular member and connected to the pivot on said frame and having the other arm thereof extending into the passage in said housing and connected to the pivot therein, a tie rod of relatively light rigid construction extending between the pivots on said depending bracket arm and said right angle portion, a bracket carried by said frame, and a coiled spring interposed between said bracket and said housing for resisting angular displacement of said lever about its pivots.

FULLERTON GEORGE
GORDON ARMSTRONG.